Dec. 3, 1929. C. J. RUKENBROD 1,738,321
MEANS FOR TESTING THE FLUX OF MATERIALS UNDER HEAT
Filed May 4, 1926
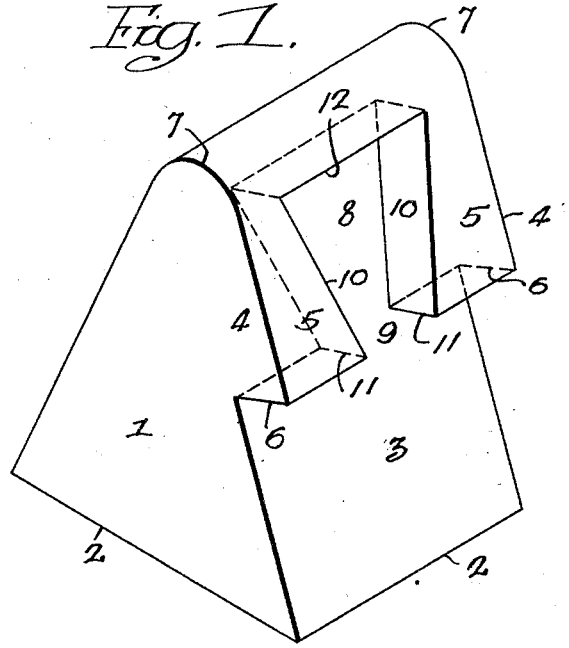
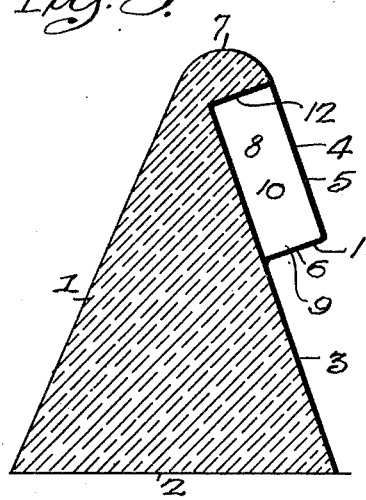
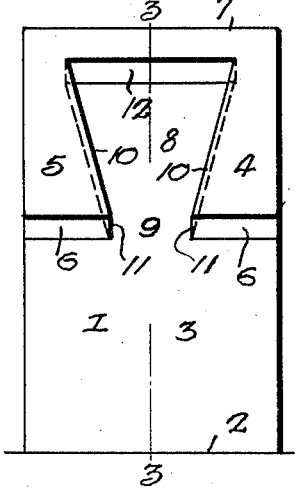
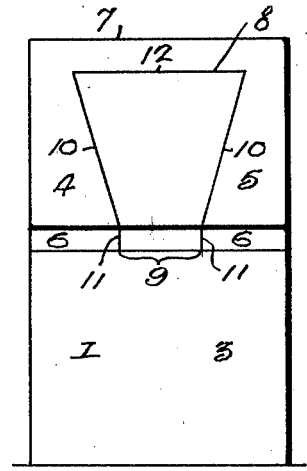
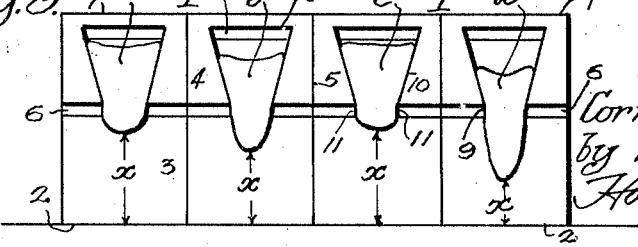
Inventor—
Cornelius J. Rukenbrod
by his Attorneys.
Howson & Howson Patented Dec. 3, 1929

1,738,321

UNITED STATES PATENT OFFICE

CORNELIUS J. RUKENBROD, OF PRINCETON, NEW JERSEY, ASSIGNOR TO THE ELECTRIC PORCELAIN AND MANUFACTURING COMPANY, OF TRENTON, NEW JERSEY, A CORPORATION OF NEW JERSEY

MEANS FOR TESTING THE FLUX OF MATERIALS UNDER HEAT

Application filed May 4, 1926. Serial No. 106,776.

The principal object of my invention is to provide a device to be used in making tests of the flux of material under heat, and a more specific object of the invention is to provide a device of the above character in which feldspar may be tested as to quality of hardness and to determine the extent to which it will flux at any pre-determined temperature.

As well known in the art of pottery making, feldspar is used as a binding medium in the manufacture of porcelain ware, the feldspar and the clay, of which the porcelain is composed, being ground to an infinitely fine degree and combined with water to form the "potter's clay" from which porcelain articles are formed.

Porcelain ware, after being formed and initially dried, is placed in a kiln and baked at a desired temperature for a definite length of time. During this baking process the feldspar in the "potter's clay" fuses and intermingles with the clay particles of the material, combining therewith to form a vitreous substance, in the form of the desired article of manufacture.

It is essential to the potter that, before baking the pre-dried articles, he should know accurately the extent to which the feldspar in the material will flux at a predetermined temperature and thereby intermingle with the clay particles of the material to bind them together in the proper manner. Potters have experienced considerable difficulty in determining the degree of fluxing in feldspar at what is recognized as standard temperature for maturing their clay bodies under heat. This is due to the fact that feldspar is at times inconsistent with respect to its degree of hardness, and therefore does not always flux to the same extent as this standard temperature.

Should a batch of articles containing feldspar that did not flux to the proper extent at the standard temperature be fired only to this temperature, the entire batch of articles would be ruined, due to the fact that the feldspar therein had not flowed properly and therefore had not combined with the clay particles therein and an unusual lack of vitrification would ensue.

By means of my invention and a simple mathematical calculation, I am able to determine definitely the degree of fluxing of the feldspar at any predetermined temperature.

In the accompanying drawings:

Fig. 1 is a perspective view of my improved testing device;

Fig. 2 is a face view of the device;

Fig. 3 is a longitudinal sectional view, taken along the line 3—3 of Fig. 2;

Fig. 4 is a view similar to Fig. 2, with a quantity of feldspar in place within the device, before making a test under heat; and Fig. 5 is a face view of a series of the devices arranged adjacent each other and showing the feldspar after the heat test, of each of the several batches of feldspar, has been completed.

The device comprises a body portion 1 composed of porcelain or some other equivalent material which will not be physically affected by heat. The body of the device has a flat base 2, and is provided with a substantially upright face 3 disposed at an angle with respect to the base 2. The face 3 is provided with an offset projection 4, whose outer face 5 is disposed at an angle parallel with the face 3 of the body portion 1. The offset projection 4 is provided with a bottom wall 6 extending outward from the face 3 substantially at the center thereof between the base 2 and the curved top 7 of the device.

The offset projection 4 is provided with a cavity 8, whose center line coincides substantially with the vertical center line of the face 3 of the device. The cavity 8 is provided with a restricted outlet 9 in the bottom wall 6 of the offset projection 4, and is also provided with side walls 10 which flare outward and upward from the edges 11 of the restricted outlet 9, intersecting with a top wall 12 of the cavity which lies in a plane substantially parallel to the bottom wall 6 of the projection 4.

The feldspar to be tested is finely divided, as above noted, and a sample thereof is placed in the cavity 8, in a manner illustrated in Fig. 4, wherein the cavity is filled to a point flush with the face 5 of the projection 4, and flush with the face of the bottom wall 6 thereof. By this means a definite amount of feldspar is placed within the cavity 8, the capacity of which may be definitely determined by calibrating the limits of the cavity 8, which include the space between the top wall 12 and the bottom wall 6, the back wall 3 and the outer face 5, the length of the restricted outlet 9 between the edges 11 thereof, and the length of the top wall 12, between the side walls 10 of the cavity.

In operation the cavity 8 of the device is filled with the material to be tested in the manner illustrated in Fig. 4, and the device so charged is placed in a kiln, or other heating device, wherein the temperature is definitely known and is maintained at a point sufficiently high to cause the hardest possible run of feldspar to flux. The test specimen is permitted to remain in the heating device above noted for a definite length of time. After a period of time has elapsed the feldspar within the cavity 8 will begin to flow, and by force of gravity will pass downward and out of the outlet 9, adhering to the face 3 of the device in its downward movement.

After remaining in the heating device the desired length of time, the device containing the fluxed feldspar is removed from the heating device and the extent of movement, determined by the lowermost point of the fluxed feldspar, is calibrated with respect to the base 2 as illustrated at $x$ in the different samples shown in Fig. 5. The amount of downward movement of the fluxed feldspar, considered in connection with the definite time of heating and the definite temperature of such heat, produces an equation by which the fluxing temperature of the particular sample at hand can be accurately determined. By this means the potter will know the temperature at which all subsequent bakings, containing this particular run of feldspar, must be maintained.

After each test of subsequent shipments of feldspar has been made, it may be desirable to arrange the specimens of the successive tests in a manner illustrated in Fig. 5, wherein four of such samples are arranged side by side, each having undergone the same treatment under identical conditions, and which is an obvious illustration of the inconsistency of quality of different shipments of feldspar, and wherein the first sample illustrated at A, under the conditions had run a comparatively slight distance from the bottom wall 6 of the projection 4. The sample illustrated at B had progressed slightly further under the same conditions, while the sample illustrated at C had not progressed as far as the sample illustrated at A, and the sample illustrated at D had progressed a considerable distance from the said wall 6.

Upon reference to the said Fig. 5, it will be apparent that the sample A was of a fair degree of hardness which would require a certain definite temperature to flux. The sample B was more of the average run requiring slightly less heat for the purpose of fluxing. The sample C is of rather extreme hardness and required a high temperature for fluxing, while the sample D was of a rather soft variety, and required a comparatively low temperature for the purpose.

It will be apparent that my invention is subject to considerable modification as to structural design without departing from the essential features of the invention and, therefore, the embodiment illustrated in the accompanying drawing is not to be construed as limiting the invention, only such limitations should therefore be placed on my invention as prescribed in the appended claims or dictated by the prior art of record.

I claim:

1. A device for testing the flux of material under heat comprising a body portion having a cavity of definite capacity and an outlet of definite area for said cavity and an exposed material supporting wall underlying and immediately adjacent to said outlet, against which the material bears as it flows from said outlet whereby the extent of flow from said outlet may be accurately measured on said wall.

2. A device for testing the flux of material under heat comprising a body portion, composed of heat resisting material, said device having a cavity of definite capacity formed therein, said cavity having an outlet of definite area and said body portion having a substantially flat exposed wall underlying and immediately adjacent to said outlet, against which the material bears as it flows from said outlet, said wall extending at an angle relative to the base of said body portion whereby the extent of flow from said outlet may be accurately measured on said wall.

3. A device for testing the flux of material under heat comprising a body portion, composed of heat resisting material, said device having a cavity of definite capacity formed therein, said cavity having an outlet of definite area, and said body portion having a substantially flat exposed wall underlying and immediately adjacent to said outlet, against which the material bears as it flows from said outlet, said wall extending at an angle relative to the base of said body portion, and in a plane coincident with the plane of one wall of said cavity whereby the extent of flow from said outlet may be accurately measured on said wall.

4. A device for testing the flux of material under heat comprising a body portion composed of heat resisting material, and having a face disposed at an angle with respect to the base thereof; an offset projection on said angular face at a point above the said base; said device having a cavity of definite capacity formed in said offset projection and an outlet of definite area formed at the base of said cavity.

5. A device for testing the flux of material under heat comprising a body portion composed of heat resisting material, and having a face disposed at an angle with respect to the base thereof; an offset projection on said angular face at a point above the said base; said device having a cavity of definite capacity formed in said offset projection and an outlet of definite area formed at the base of said cavity, adjacent the angular face of said body portion.

6. A device for testing the flux of material under heat comprising a body portion composed of heat resisting material, and having a face disposed at an angle with respect to the base thereof; an offset projection on said angular face having an outer face parallel to the angular face of said body portion and a bottom perpendicular thereto, at a point above the base of said body portion; said device having a cavity of definite capacity formed in said offset projection and an outlet of definite area formed at the base of said cavity in the bottom wall of said offset projection.

7. A device for testing the flux of material under heat comprising a body portion composed of heat resisting material, and having a face disposed at an angle with respect to the base thereof; an offset projection on said angular face having an outer face parallel to the angular face of said body portion and a bottom perpendicular thereto at a point above the base of said body portion; said device having a cavity of definite capacity formed in said offset projection and a rectangular outlet of definite area formed at the base of said cavity in the bottom wall of said offset projection, and extending from the face of said projection to the face of said body portion.

8. A device for testing the flux of material under heat comprising a body portion composed of heat resisting material, and having a face disposed at an angle with respect to the base thereof; an offset projection on said angular face having an outer face parallel to the angular face of said body portion, and a bottom wall extending in a plane perpendicular thereto, at a point above the base of said body portion; said device having a cavity of definite capacity formed in said offset projection and an outlet of definite area formed at the base of said cavity in the bottom wall of said offset projection, the top wall of said cavity lying within said projection and parallel to said bottom wall thereof and the side walls of the cavity extending respectively in straight lines flaring outward and upward from the opposite edges of said outlet, to the said top wall of said cavity.

9. A device for testing the flux of material under heat comprising a body portion composed of heat resisting material, and having a face disposed at an angle with respect to the base thereof; an offset projection on said angular face having an outer face parallel to the angular face of said body portion and a bottom wall extending in a plane perpendicular thereto at a point above the base of said body portion; said device having a cavity of definite capacity formed in said offset projection and a rectangular outlet of definite area formed at the base of said cavity in the bottom wall of said offset projection, said outlet having side edges extending in a plane perpendicular to and extending from the outer face of the projection to the adjacent face of the body portion; said cavity also having side walls extending respectively in straight lines flaring outward and upward from the opposite edges of said outlet, to the top wall of said cavity which is disposed parallel to the bottom wall of said offset projection.

CORNELIUS J. RUKENBROD.